(12) United States Patent
Kim et al.

(10) Patent No.: US 11,550,906 B2
(45) Date of Patent: Jan. 10, 2023

(54) STORAGE SYSTEM WITH SEPARATED RPMB SUB-SYSTEMS AND METHOD OF OPERATING THE SAME

(71) Applicant: SAMSUNG ELECTRONICS CO., LTD., Suwon-si (KR)

(72) Inventors: Sunghyun Kim, Suwon-si (KR); Yoonjick Lee, Suwon-si (KR); Junho Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 16/790,217

(22) Filed: Feb. 13, 2020

(65) Prior Publication Data

US 2020/0356669 A1    Nov. 12, 2020

(30) Foreign Application Priority Data

May 7, 2019  (KR) .......................... 10-2019-0052829

(51) Int. Cl.

| G06F 21/55 | (2013.01) |
|---|---|
| G06F 3/06 | (2006.01) |
| G06F 21/62 | (2013.01) |
| G06F 12/14 | (2006.01) |

(52) U.S. Cl.
CPC ............ *G06F 21/554* (2013.01); *G06F 3/064* (2013.01); *G06F 3/0622* (2013.01); *G06F 3/0679* (2013.01); *G06F 12/1408* (2013.01); *G06F 21/6218* (2013.01); *G06F 2221/034* (2013.01)

(58) Field of Classification Search
CPC ...... G06F 21/554; G06F 3/0622; G06F 3/064; G06F 3/0679; G06F 12/1408; G06F 21/6218; G06F 2221/034; G06F 21/79; G06F 21/71
See application file for complete search history.

(56) References Cited

U.S. PATENT DOCUMENTS

| 9,076,019 | B2 | 7/2015 | Gueron et al. |
| 9,329,992 | B2 | 5/2016 | Wu et al. |
| 9,384,351 | B2 | 7/2016 | Mejia et al. |
| 9,471,793 | B2 | 10/2016 | Gail et al. |
| 11,088,845 | B2 * | 8/2021 | Sela ........................ G06F 21/79 |

(Continued)

FOREIGN PATENT DOCUMENTS

JP    2015-0225376 A    12/2015

*Primary Examiner* — Christopher A Revak
(74) *Attorney, Agent, or Firm* — Sughrue Mion, PLLC

(57) ABSTRACT

A storage system includes a host device including a host processor and a secure element distinguished from the host processor, and a storage device that includes a first memory area accessed by the host processor, and a second memory area distinguished from the first memory area and accessed by the secure element. The host processor includes a first replay protected memory block (RPMB) key and a first RPMB counter for a first RPMB subsystem of the host processor. The secure element includes a second RPMB key and a second RPMB counter for a second RPMB subsystem of secure element. The first memory area includes a third RPMB key, a third RPMB counter and a first data space of the first RPMB sub-system. The second memory area includes a fourth RPMB key, a fourth RPMB counter and a second data space of the second RPMB sub-system.

20 Claims, 10 Drawing Sheets

(56) References Cited

U.S. PATENT DOCUMENTS

| | | |
|---|---|---|
| 2016/0070656 A1 | 3/2016 | Babu et al. |
| 2018/0091298 A1 | 3/2018 | Saurav et al. |
| 2018/0314626 A1 | 11/2018 | Kuo |
| 2019/0013081 A1* | 1/2019 | Blodgett ................. G06F 21/79 |
| 2020/0210596 A1* | 7/2020 | Cariello ................ G06F 21/602 |
| 2020/0285498 A1* | 9/2020 | Keeth ................ G06F 21/6218 |
| 2021/0334016 A1* | 10/2021 | Jean ........................ G06F 21/79 |
| 2022/0019356 A1* | 1/2022 | Hong .................... G06F 3/0659 |
| 2022/0091760 A1* | 3/2022 | Lee ........................ G06F 3/064 |

\* cited by examiner

STORAGE SYSTEM WITH SEPARATED RPMB SUB-SYSTEMS AND METHOD OF OPERATING THE SAME

CROSS-REFERENCE TO RELATED APPLICATION

This application claims priority under 35 USC § 119 to Korean Patent Application No. 10-2019-0052829, filed on May 7, 2019 in the Korean Intellectual Property Office (KIPO), the contents of which are herein incorporated by reference in their entirety.

BACKGROUND

1. Technical Field

Systems and methods consistent with the present disclosure relate generally to semiconductor integrated circuits, and more particularly to storage systems with separated replay protected memory block (RPMB) sub-systems, and methods of operating the storage systems.

2. Description of the Related Art

Certain types of data storage devices include one or more semiconductor memory devices. Examples of such data storage devices include embedded multi-media cards (eMMCs), universal flash storages (UFSs). These types of data storage devices may enjoy various design and performance advantages over conventional hard disk drives (HDDs). Examples of potential advantages include the absence of moving mechanical parts, higher data access speeds, improved stability and durability, and low power consumption, to name but a few. These types of data storage device usually include nonvolatile memories, e.g., flash memories. In addition, these types of data storage device may provide a replay protected memory block (RPMB) sub-system and/or function to prevent a replay attack. The replay attack represents an attack that masquerades as a legitimate user by selecting a valid message on a protocol and then copying the valid message and re-transmitting the message later.

SUMMARY

It is an aspect to provide a storage system capable of improving security performance by separating RPMB sub-systems.

It is another aspect to provide a method of operating the storage system.

According to an aspect of an example embodiment, there is provided a storage system includes a host device and a storage device. The host device includes a host processor and a secure element distinguished from the host processor. The storage device is controlled by the host device, and includes a first memory area accessed by the host processor, and a second memory area distinguished from the first memory area and accessed by the secure element. The host processor includes a first replay protected memory block (RPMB) key and a first RPMB counter that are associated with a first RPMB sub-system for the host processor. The secure element includes a second RPMB key and a second RPMB counter that are associated with a second RPMB sub-system for the secure element. The first memory area includes a third RPMB key, a third RPMB counter and a first data space that are associated with the first RPMB sub-system for the host processor. The second memory area includes a fourth RPMB key, a fourth RPMB counter and a second data space that are associated with the second RPMB sub-system for the secure element.

According to another aspect of an example embodiment, there is provided a method of operating a storage system including a host device and a storage device, the host device includes a host processor and a secure element distinguished from each other. The storage device is controlled by the host device and includes a first memory area and a second memory area distinguished from each other. A first replay protected memory block (RPMB) sub-system for the host processor and a second RPMB sub-system for the secure element are separately formed such that the host processor includes a first RPMB key and a first RPMB counter that are associated with the first RPMB sub-system for the host processor, the secure element includes a second RPMB key and a second RPMB counter that are associated with the second RPMB sub-system for the secure element, the first memory area accessed by the host processor includes a third RPMB key, a third RPMB counter and a first data space that are associated with the first RPMB sub-system for the host processor, and the second memory area accessed by the secure element includes a fourth RPMB key, a fourth RPMB counter and a second data space that are associated with the second RPMB sub-system for the secure element. The first RPMB sub-system for the host processor is executed based on the host processor, the first RPMB key, the first RPMB counter, the first memory area, the third RPMB key, the third RPMB counter and the first data space. The second RPMB sub-system for the secure element is executed based on the secure element, the second RPMB key, the second RPMB counter, the second memory area, the fourth RPMB key, the fourth RPMB counter and the second data space.

BRIEF DESCRIPTION OF THE DRAWINGS

Illustrative, non-limiting example embodiments will be more clearly understood from the following detailed description taken in conjunction with the accompanying drawings, in which.

DETAILED DESCRIPTION

Figure 1:
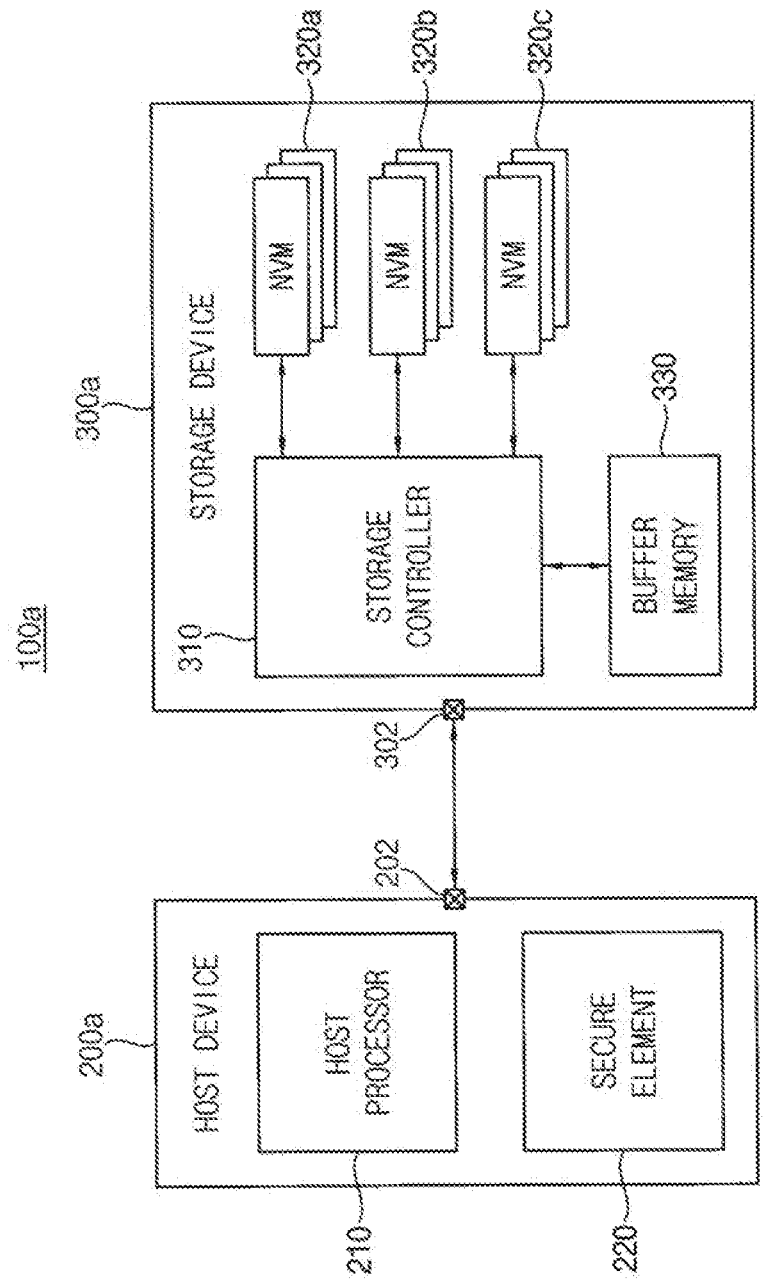
FIG. 1 is a block diagram illustrating a storage system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

In the storage system and the method of operating the storage system according to example embodiments, the separated RPMB sub-systems may be implemented. For example, when the RPMB sub-systems are implemented in a host device integrated with a secure element, where the secure element is distinguished from a host processor of the host device, a first memory area for a first RPMB sub-system for the host processor and a second memory area for a second RPMB sub-system for the secure element may be separated from each other in a storage device, and a key, a counter and a data space for the first RPMB sub-system for the host processor and a key, a counter and a data space for the second RPMB sub-system for the secure element may be separated from each other in the storage device. Accordingly, the first RPMB function for the host processor and the second RPMB function for the secure element may be separately and efficiently implemented, a portion associated with the secure element may not be attacked even if the host processor is hacked, thereby having a higher security level compared to an implementation of the related art in which RPMB sub-systems are not separated.

FIG. 1 is a block diagram illustrating a storage system according to example embodiments.

Referring to FIG. 1, a storage system 100a includes a host device 200a and a storage device 300a.

The host device 200a controls overall operations of the storage system 100a. The host device 200a includes a host processor 210 and a secure element (SE) 220. The host device 200a may further include a first pin 202 and a host memory (not shown).

The host processor 210 controls an operation of the host device 200a. For example, the host processor 210 may execute an operating system (OS) to drive the storage system 100a, and may execute various applications such as providing an internet browser, executing a game, displaying a video file, controlling a camera module, etc. The operating system executed by the host processor 210 may include a file system for file management and a device driver for controlling peripheral devices including the storage device 300a at the operating system level.

In some example embodiments, the host processor 210 may be a central processing unit (CPU), a microprocessor, an application processor (AP), etc. In some example embodiments, the host processor 210 may include a single processor core. In some example embodiments, the host processor 210 may include a plurality of processor cores.

The secure element 220 is separate, distinguished and/or distinct from the host processor 210. The secure element 220 controls an operation of the host device 200a in a secure mode independently of the host processor 210, and/or controls various functions of the secure element 220 by itself. For example, the secure element 220 may be resistant against tampering attacks, such as a replay attack, microprobing, a software attack, eavesdropping, a fault generation attack, etc. The secure element 220 may be referred to as a security hardware, a security component or a security module. Although not illustrated in FIG. 1, the secure element 220 may include a secure processor, a secure memory, etc.

In some example embodiments, the secure element 220 may be an integrated secure element (iSE) and/or an embedded secure element (eSE) integrated into the host device 200a. In other words, the host device 200a may be implemented in the form of a single semiconductor package including the secure element 220.

The first pin 202 may be electrically connected to the host processor 210 and the secure element 220. The host device 200a may exchange signals with the storage device 300a via the first pin 202.

The host memory (not shown) may store instructions and/or data that are executed and/or processed by the host processor. For example, the host memory may store a boot image, the file system, the device driver, and/or the applications.

In some example embodiments, the host device 200a may be implemented in the form of a system-on-chip (SoC).

The host device 200a may control data write/read operations to the storage device 300a. For example, when it is desired to write specific data into the storage device 300a, the host device 200a may provide a write command, a write address and data to be written to the storage device 300a. In addition, when it is desired to read specific data from the storage device 300a, the host device 200a may provide a read command and a read address to the storage device 300a and may receive data retrieved from the storage device 300a.

The storage device 300a is accessed and controlled by the host device 200a. The storage device 300a may include a storage controller 310, a plurality of nonvolatile memories (NVMs) 320a, 320b and 320c, a buffer memory 330 and a second pin 302.

The storage controller 310 may control an operation of the storage device 300a, e.g., the data write/read operations, based on a command, an address and data that are received from the host device 200a.

The plurality of nonvolatile memories 320a, 320b and 320c may store a plurality of data. For example, the plurality of nonvolatile memories 320a, 320b and 320c may store meta data, secure data, user data, etc. As will be described with reference to FIG. 2, the plurality of nonvolatile memories 320a, 320b and 320c may be divided into a first memory area accessed by the host processor 210 and a second memory area accessed by the secure element 220.

In some example embodiments, each of the plurality of nonvolatile memories 320a, 320b and 320c may include a flash memory (e.g., a NAND flash memory). In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a dynamic random access memory (DRAM), a static random access memory (SRAM), or the like.

The second pin 302 may be electrically connected to the storage controller 310. The storage device 300a may exchange signals with the host device 200a via the second pin 302.

The storage device 300a is implemented to provide and/or support a replay protected memory block (RPMB) function or scheme. The RPMB is a function to prevent replay attacks (or retransmission attacks), and is a security function including a random nonce and a counter for communication between the host device 200a and the storage device 300a in order to prevent retransmission of specific security contents. A RPMB sub-system or a RPMB region for the RPMB function may be a storage space in which data is restrictedly or narrowly read, modified or deleted. The storage system 100a may be configured to allow access to the RPMB sub-system only for a particular set of instructions. For example, data in the RPMB sub-system may only be read, modified or deleted in response to instructions from a trusted application. In addition, the data in the RPMB sub-system may not be read, modified or deleted in response to instructions from a normal application, unless the normal application is a trusted application. For example, the RPMB sub-system may store a value capable of generating an encryption key for encrypting security information.

In the storage system 100a according to example embodiments, a first RPMB sub-system for the host processor 210 (e.g., a RPMB function for the host processor 210) and a second RPMB sub-system for the secure element 220 (e.g., a RPMB function for the secure element 220) may be separately formed (e.g., separate, distinguished and/or distinct from each other), and this will be described in detail with reference to FIG. 2.

In some example embodiments, the storage device 300a may be an embedded multi-media card (eMMC) or a universal flash storage (UFS) that provides and/or supports the RPMB function. In other example embodiments, the storage device 300a may be any storage device that provides and/or supports the RPMB function, e.g., a solid state drive (SSD), a multi media card (MMC), a secure digital (SD) card, a micro SD card, a memory stick, a chip card, a universal serial bus (USB) card, a smart card, a compact flash (CF) card, or the like.

The storage system 100a may further include a first interface disposed between the first pin 202 of the host device 200a and the second pin 302 of the storage device 300a. In FIG. 1, a bi-directional arrow illustrated between the first pin 202 and the second pin 302 may represent the first interface. The host device 200a and the storage device 300a may communicate via the first pin 202, the second pin 302 and the first interface.

Although FIG. 1 illustrates an example where the first interface is formed between one first pin 202 and one second pin 302, the example embodiments are not limited thereto. For example, the first interface may be formed between a plurality of first pins included in the host device 200a and a plurality of second pins included in the storage device 300a.

The first interface may represent a bidirectional digital interface that may transmit a digital stream, e.g., a sequence of bits. For example, a single wire or multiple wires may be implemented as an electrical transmission line, e.g., a microstrip manufactured using printed circuit board (PCB) technology, but inventive concepts are not limited thereto.

In some example embodiments, the storage device 300a may be connected to the host device 200a through a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300a may use a block accessible address space corresponding to an access size of the plurality of nonvolatile memories 320a, 320b and 320c to provide the block accessible interface to the host 200, for allowing the access by units of a memory block with respect to data stored in the plurality of nonvolatile memories 320a, 320b and 320c. In other words, the first interface may be the block accessible interface.

In some example embodiments, the storage system 100a may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc. In other example embodiments, the storage system 100a may be any computing system, such as a personal computer (PC), a server computer, a workstation, a digital television, a set-top box, a navigation system, etc.

Figure 2:
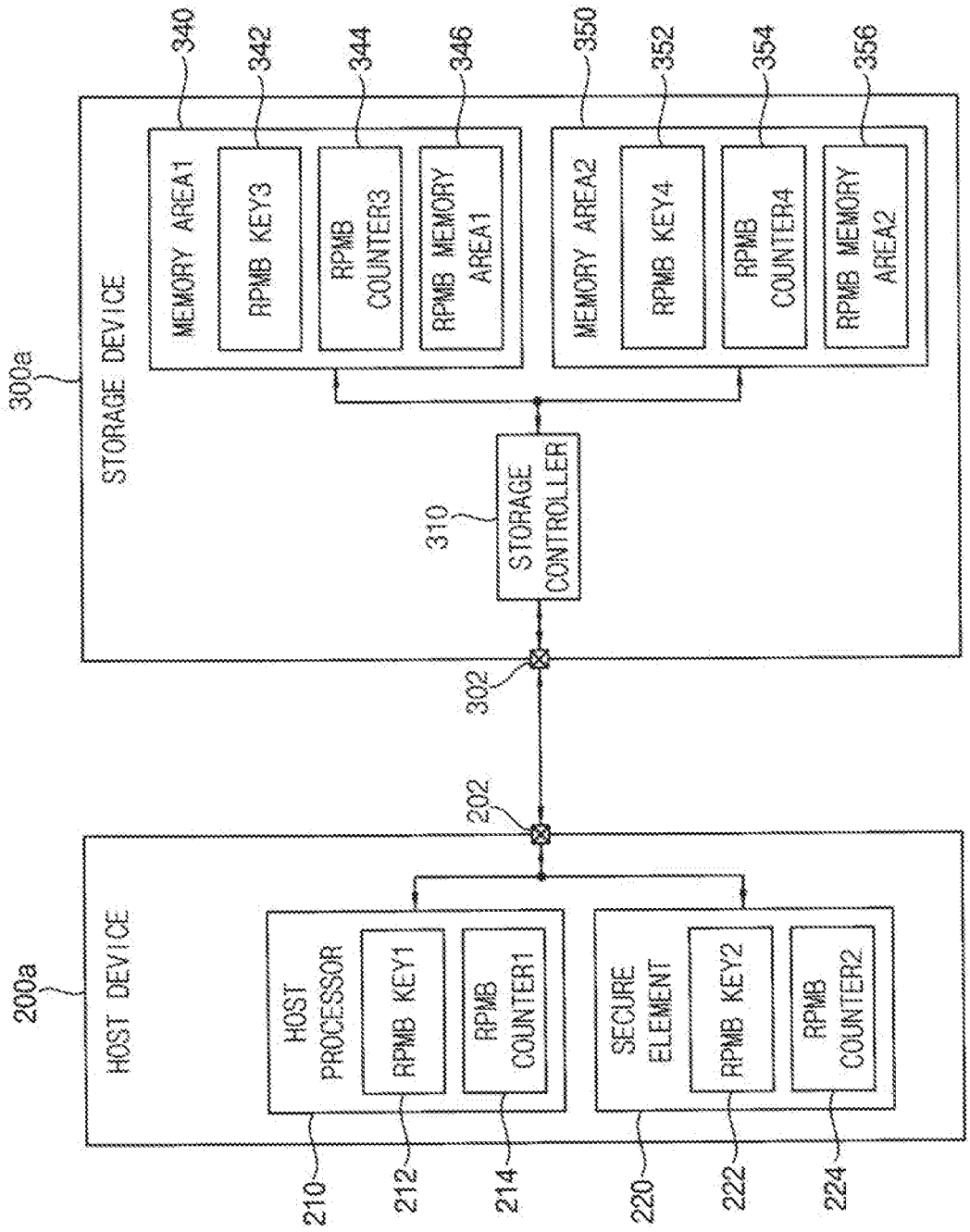
FIG. 2 is a block diagram illustrating an example where a RPMB sub-system for a host processor and a RPMB sub-system for a secure element are separate from each other in the storage system of FIG. 1, according to example embodiments.

FIG. 2 is a block diagram illustrating an example where a RPMB sub-system for a host processor and a RPMB sub-system for a secure element are separate from each other in the storage system of FIG. 1, according to example embodiments. For convenience of illustration, some elements in the storage system 100a that are unrelated to the example embodiments are omitted in FIG. 2.

Referring to FIG. 2, the host processor 210 that is included in the host device 200a includes a first RPMB key (RPMB KEY1) 212 and a first RPMB counter (RPMB COUNTER1) 214 that are associated with a first RPMB sub-system (or a first RPMB function) for the host processor 210. The first RPMB key 212 may be used to encrypt/decrypt security data while executing the first RPMB sub-system for the host processor 210. The first RPMB counter 214 may be used to prevent a replay attack. For example, when security data is transmitted while executing the first RPMB sub-system for the host processor 210, a first count value generated by the first RPMB counter 214 may increase.

The secure element 220 that is included in the host device 200a and distinguished from the host processor 210 includes a second RPMB key (RPMB KEY2) 222 and a second RPMB counter (RPMB COUNTER2) 224 that are associated with a second RPMB sub-system (or a second RPMB function) for the secure element 220. The second RPMB key 222 may be used to encrypt/decrypt security data while executing the second RPMB sub-system for the secure element 220. The second RPMB counter 224 may be used to prevent a replay attack. For example, when security data is transmitted while executing the second RPMB sub-system for the secure element 220, a second count value generated by the second RPMB counter 224 may increase.

In some example embodiments, a value of the first RPMB key 212 and a value of the second RPMB key 222 may be different from each other, and the first count value by the first RPMB counter 214 and the second count value by the second RPMB counter 224 may be different from each other. In other words, the first RPMB sub-system for the host processor 210 and the second RPMB sub-system for the secure element 220 may be implemented separately from each other, and may be executed or performed independently of each other or individually.

A first memory area (MEMORY AREA1) 340 that is included in the storage device 300a and accessed by the host processor 210 includes a third RPMB key (RPMB KEY3) 342, a third RPMB counter (RPMB COUNTER3) 344 and a first data space (RPMB MEMORY AREA1) 346 that are associated with the first RPMB sub-system for the host processor 210. For example, the first memory area 340 may be accessed only by the host processor 210 and not by the secure element 220. As with the first RPMB key 212, the third RPMB key 342 may be used to encrypt/decrypt security data while executing the first RPMB sub-system for the host processor 210. As with the first RPMB counter 214, the third RPMB counter 344 may be used to prevent a replay attack. For example, when security data is transmitted while executing the first RPMB sub-system for the host processor 210, a third count value generated by the third RPMB counter 344 may increase. The first data space 346 may store security data transmitted by the first RPMB sub-system for the host processor 210.

In some example embodiments, the value of the first RPMB key 212 and a value of the third RPMB key 342 may be equal to each other, and the first count value by the first RPMB counter 214 and the third count value by the third RPMB counter 344 may be equal to each other. In other words, to implement the first RPMB sub-system (or the first RPMB function) for the host processor 210, the host processor 210 and the first memory area 340 may include the RPMB keys having the same value and the RPMB counters generating the same count value.

A second memory area 350 that is included in the storage device 300a and accessed by the secure element 220 includes a fourth RPMB key (RPMB KEY4) 352, a fourth RPMB counter (RPMB COUNTER4) 354 and a second data space (RPMB MEMORY AREA2) 356 that are associated with the second RPMB sub-system for the secure element 220. For example, the second memory area 350 may be accessed only by the secure element 220 and not by the host processor 210. As with the second RPMB key 222, the fourth RPMB key 352 may be used to encrypt/decrypt security data while executing the second RPMB sub-system for the secure element 220. As with the second RPMB counter 224, the fourth RPMB counter 354 may be used to prevent a replay attack. For example, when security data is transmitted while executing the second RPMB sub-system for the secure element 220, a fourth count value generated by the fourth RPMB counter 354 may increase. The second data space 356 may store security data transmitted by the second RPMB sub-system for the secure element 220.

In some example embodiments, the value of the second RPMB key 222 and a value of the fourth RPMB key 352 may be equal to each other, and the second count value by the second RPMB counter 224 and the fourth count value by the fourth RPMB counter 354 may be equal to each other. In other words, to implement the second RPMB sub-system (or the second RPMB function) for the secure element 220, the secure element 220 and the second memory area 350 may include the RPMB keys having the same value and the RPMB counters generating the same count value.

In some example embodiments, the value of the third RPMB key 342 and the value of the fourth RPMB key 352 may be different from each other because the value of the first RPMB key 212 and the value of the third RPMB key 342 are equal to each other, the value of the second RPMB key 222 and the value of the fourth RPMB key 352 are equal to each other, and the value of the first RPMB key 212 and the value of the second RPMB key 222 are different from each other. Similarly, the third count value and the fourth count value may be different from each other because the first count value and the third count value are equal to each other, the second count value and the fourth count value are equal to each other, and the first count value and the second count value may be different from each other.

In some example embodiments, at least a part of the RPMB counters 214, 224, 344 and 354 may be implemented as instruction codes or program routines (e.g., a software program). For example, the instruction codes or the program routines may be executed by a computer-based electronic system, and may be stored in any storage device located inside or outside the computer-based electronic system. However, the example embodiments are not limited thereto. In other example embodiments, at least a part of the RPMB counters 214, 224, 344 and 354 may be implemented as hardware. For example, at least a part of the RPMB counters 214, 224, 344 and 354 may be included in a computer-based electronic system.

In some example embodiments, the first memory area 340 and the second memory area 350 may be included in the same nonvolatile memory. In other example embodiments, the first memory area 340 and the second memory area 350 may be included in different nonvolatile memories.

The storage controller 310 may control access to the first memory area 340 and the second memory area 350. In other words, the first memory area 340 and the second memory area 350 may be controlled by the same storage controller 310 in an example of FIG. 2.

The first pin 202 may be connected in common to the host processor 210 and the secure element 220, the second pin 302 may be connected to the storage controller 310, and the first interface may be disposed or formed between the first pin 202 and the second pin 302. For example, if the storage device 300a is an eMMC, the first interface may include a normal or general eMMC interface. If the storage device 300a is a UFS, the first interface may include a normal or general UFS interface.

In an example of FIG. 2, the host processor 210, the first pin 202, the first interface, the second pin 302, the storage controller 310 and the first memory area 340 may form the first RPMB sub-system for the host processor 210. In the example of FIG. 2, the secure element 220, the first pin 202, the first interface, the second pin 302, the storage controller 310 and the second memory area 350 may form the second RPMB sub-system for the secure element 220. In other words, the first memory area 340 and the second memory area 350 are separate, distinguished and/or distinct from each other to functionally separate the first RPMB sub-system for the host processor 210 and the second RPMB sub-system for the secure element 220. However, some elements (e.g., the first pin 202, the first interface, the second pin 302 and the storage controller 310) may be shared by the first RPMB sub-system for the host processor 210 and the second RPMB sub-system for the secure element 220.

The host processor 210 may access the first memory area 340 via the first pin 202, the first interface, the second pin 302 and the storage controller 310, and the secure element 220 may access the second memory area 350 via the first pin 202, the first interface, the second pin 302 and the storage controller 310. In other words, the first memory area 340 and the second memory area 350 may be accessed using the same interface in an example of FIG. 2.

A detailed description of a data transmission operation according to the RPMB sub-system (or the RPMB function) will be omitted for conciseness. However, hereinafter, an operation of the first RPMB sub-system for the host processor 210 will be briefly described.

When it is desired to perform a data write operation according to the first RPMB sub-system for the host processor 210, the host processor 210 may encrypt security data using the first RPMB key 212, may increase the first count value by the first RPMB counter 214 by 1, and may transmit the encrypted security data and the first count value to the first memory area 340. The first memory area 340 may decrypt the encrypted security data using the third RPMB key 342, may increase the third count value by the third RPMB counter 344 by 1 so as to be equal to the first count value, and may store the decrypted security data in the first data space 346.

When it is desired to perform a data read operation according to the first RPMB sub-system for the host processor 210, the host processor 210 may request reading of the security data stored in the first data space 346. The first memory area 340 may encrypt the security data using the third RPMB key 342, and may transmit the encrypted security data and the third count value to the host processor 210. The host processor 210 may compare the third count value with the first count value. When the third count value and the first count value are equal to each other, the host processor 210 may determine that it is a normal operation, may decrypt the encrypted security data using the first RPMB key 212, and may perform desired data processing using the decrypted security data. When the third count value and the first count value are different from each other, the host processor 210 may determine that a replay attack has occurred, and may take appropriate countermeasures (e.g., discard the received data, warnings, power down, etc.).

Although not described in detail, data write/read operations according to the second RPMB sub-system for the secure element 220 may also be performed similarly to the above.

The storage system 100a according to example embodiments may have the separated RPMB sub-systems. For example, when the RPMB sub-systems are implemented in the host device 200a integrated with the secure element 220, where the secure element is distinguished from the host processor 210, the first memory area 340 for the first RPMB sub-system for the host processor 210 and the second memory area 350 for the second RPMB sub-system for the secure element 220 may be separated from each other in the storage device 300a, and the key, the counter and the data space for the first RPMB sub-system for the host processor 210 and the key, the counter and the data space for the second RPMB sub-system for the secure element 220 may be separated from each other. Accordingly, the first RPMB function for the host processor 210 and the second RPMB function for the secure element 220 may be separately and efficiently implemented, a portion associated with the secure element 220 may not be attacked even if the host processor 210 is hacked, thereby having a higher security level compared to an implementation of the related art in which only one RPMB sub-system is provided or in which RPMB sub-systems are not separated.

Figure 3:
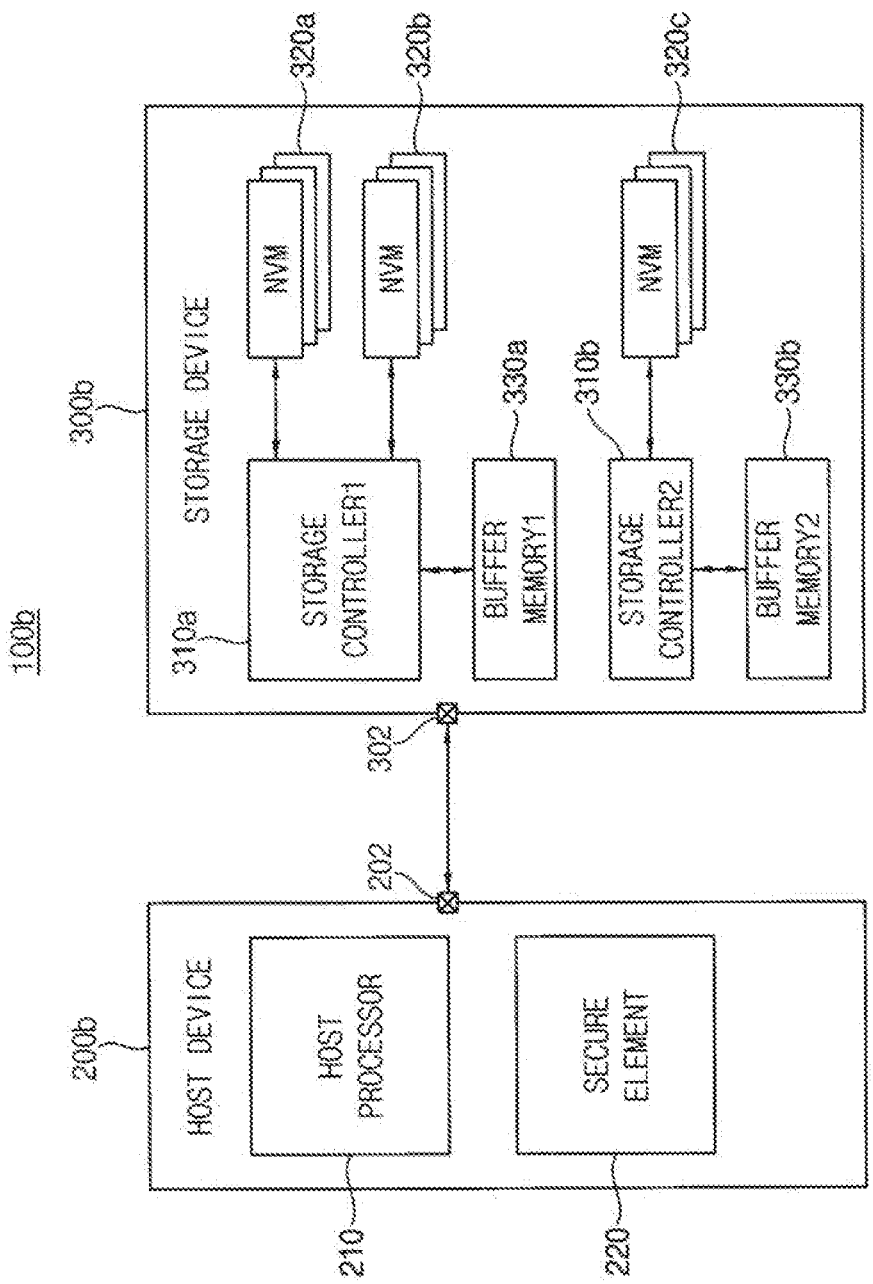
FIG. 3 is a block diagram illustrating a storage system according to example embodiments.

FIG. 3 is a block diagram illustrating a storage system according to example embodiments. The descriptions repeated with FIG. 1 will be omitted for conciseness.

Referring to FIG. 3, a storage system 100b includes a host device 200b and a storage device 300b. The host device 200b may include a host processor 210, a secure element 220 and a first pin 202. The storage device 300b may include a first storage controller 310a, a second storage controller 310b, a plurality of nonvolatile memories (NVMs) 320a, 320b and 320c, a first buffer memory 330a, a second buffer memory 330b and a second pin 302.

The storage system 100b of FIG. 3 may be substantially the same as the storage system 100a of FIG. 1, except that the storage device 300b in FIG. 3 includes two storage controllers 310a and 310b and two buffer memories 330a and 330b. The host processor 210, the secure element 220 and the plurality of nonvolatile memories 320a, 320b, and 320c in FIG. 3 may be substantially the same as the host processor 210, the secure element 220 and the plurality of nonvolatile memories 320a, 320b, and 320c in FIG. 1, respectively.

The storage controllers 310a and 310b may be separately formed and may control an operation of the storage device 300b. The first storage controller 310a may control an operation of some (e.g., the nonvolatile memories (NVMs) 320a and 320b) of the plurality of nonvolatile memories 320a, 320b and 320c. The second storage controller 310b may control an operation of the remaining (e.g., the nonvolatile memory (NVM) 320c) of the plurality of nonvolatile memories 320a, 320b and 320c.

The first buffer memory 330a may store instructions and/or data that are executed and/or processed by the first storage controller 310a, and may temporarily store data stored in or to be stored into the nonvolatile memories 320a and 320b. The second buffer memory 330b may store instructions and/or data that are executed and/or processed by the second storage controller 310b, and may temporarily store data stored in or to be stored into the nonvolatile memory 320c.

The second pin 302 may be electrically connected to the first and second storage controllers 310a and 310b. The storage device 300b may exchange signals with the host device 200b via the second pin 302.

Although not illustrated in FIG. 3, in some example embodiments, the two storage controllers 310a and 310b may share one buffer memory.

Figure 4:
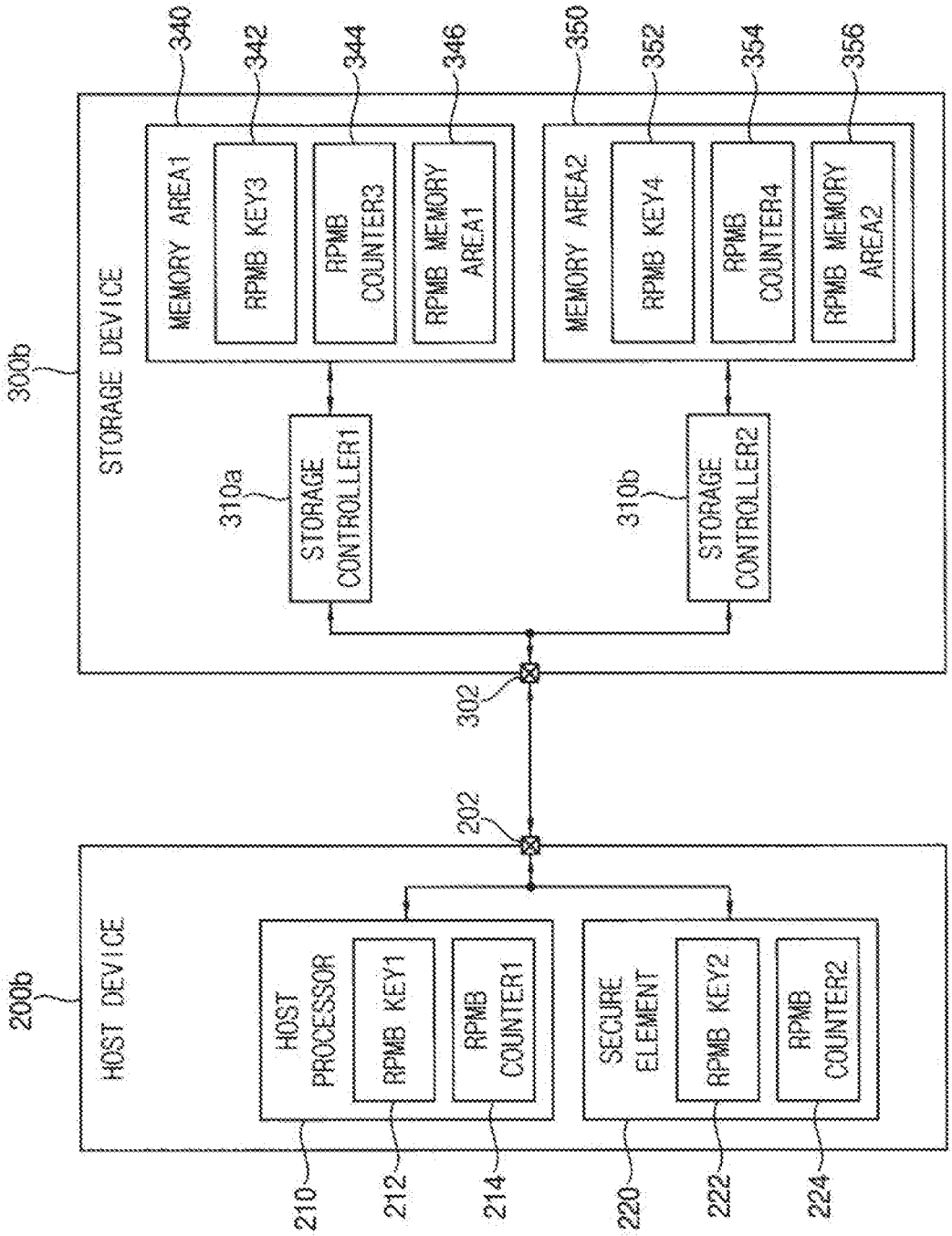
FIG. 4 is a block diagram illustrating an example where a RPMB sub-system for a host processor and a RPMB sub-system for a secure element are separate from each other in the storage system of FIG. 3, according to example embodiments.

FIG. 4 is a block diagram illustrating an example where a RPMB sub-system for a host processor and a RPMB sub-system for a secure element are separate from each other in the storage system of FIG. 3, according to example embodiments. The descriptions repeated with FIG. 2 will be omitted for conciseness.

Referring to FIG. 4, a configuration of the host device 200b and configurations of the first and second memory areas 340 and 350 included in the storage device 300b may be substantially the same as those described with reference to FIG. 2.

The first storage controller 310a may control access to the first memory area 340. The second storage controller 310b may be separate, distinguished and/or distinct from the first storage controller 310a, and may control access to the second memory area 350. In other words, the first memory area 340 and the second memory area 350 may be controlled by the different storage controllers 310a and 310b in an example of FIG. 4. The second pin 302 may be connected in common to the first storage controller 310a and the second storage controller 310b.

In some example embodiments, the first memory area 340 and the second memory area 350 may be included in different nonvolatile memories because the different storage controllers 310a, 310b generally control different nonvolatile memories. However, the example embodiments are not limited thereto. In other example embodiments, the first memory area 340 and the second memory area 350 may be included in the same nonvolatile memory.

In an example of FIG. 4, the host processor 210, the first pin 202, the first interface, the second pin 302, the first storage controller 310a and the first memory area 340 may form the first RPMB sub-system for the host processor 210. In the example of FIG. 4, the secure element 220, the first pin 202, the first interface, the second pin 302, the second storage controller 310b and the second memory area 350 may form the second RPMB sub-system for the secure element 220. In other words, the first memory area 340 and the second memory area 350 are separate, distinguished and/or distinct from each other to functionally separate the first RPMB sub-system for the host processor 210 and the second RPMB sub-system for the secure element 220. However, some elements (e.g., the first pin 202, the first interface and the second pin 302) may be shared by the first RPMB sub-system for the host processor 210 and the second RPMB sub-system for the secure element 220. The example of FIG. 4 may have a higher security level by not sharing the storage controller as compared to an example of FIG. 2.

The host processor 210 may access the first memory area 340 via the first pin 202, the first interface, the second pin 302 and the first storage controller 310a, and the secure element 220 may access the second memory area 350 via the first pin 202, the first interface, the second pin 302 and the second storage controller 310b. In other words, the first memory area 340 and the second memory area 350 may be accessed using the same interface in an example of FIG. 2.

Figure 5:
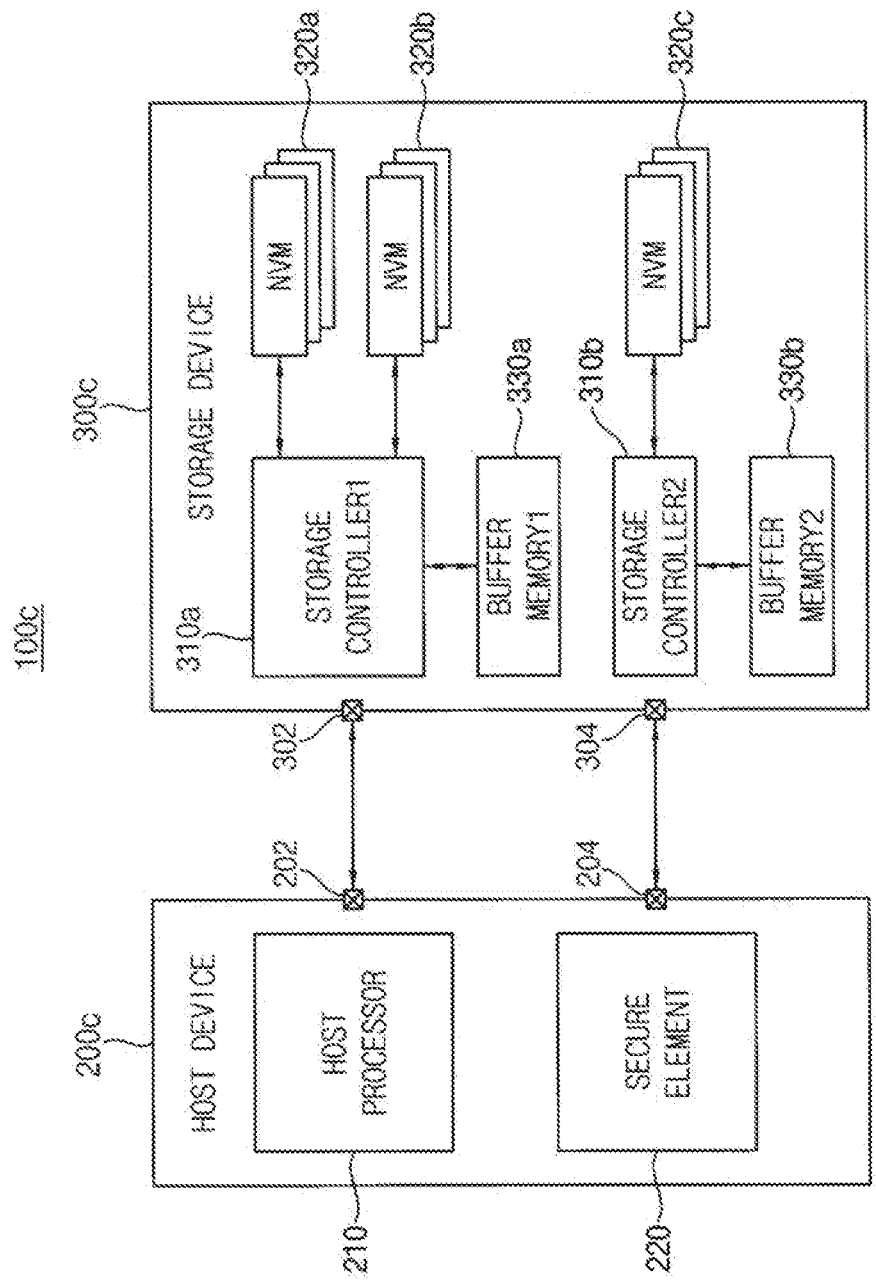
FIG. 5 is a block diagram illustrating a storage system according to example embodiments.

FIG. 5 is a block diagram illustrating a storage system according to example embodiments. The descriptions repeated with FIGS. 1 and 3 will be omitted for conciseness.

Referring to FIG. 5, a storage system 100c includes a host device 200c and a storage device 300c. The host device 200c may include a host processor 210, a secure element 220, a first pin 202 and a third pin 204. The storage device 300c may include a first storage controller 310a, a second storage controller 310b, a plurality of nonvolatile memories (NVMs) 320a, 320b and 320c, a first buffer memory 330a, a second buffer memory 330b, a second pin 302 and a fourth pin 304.

The storage system 100c of FIG. 5 may be substantially the same as the storage system 100b of FIG. 3, except that the host device 200c in FIG. 5 further includes the third pin 204, the storage device 300c in FIG. 5 further includes the fourth pin 304, and the storage system 100c further includes a second interface. The host processor 210, the secure element 220, the first storage controller 310a, the second storage controller 310b, the plurality of nonvolatile memories 320a, 320b and 320c, the first buffer memory 330a and the second buffer memory 330b in FIG. 5 may be substantially the same as the host processor 210, the secure element 220, the first storage controller 310a, the second storage controller 310b, the plurality of nonvolatile memories 320a, 320b and 320c, the first buffer memory 330a and the second buffer memory 330b in FIG. 3, respectively.

The first pin 202 may be electrically connected to the host processor 210, and the third pin 204 may be electrically connected to the secure element 220. The host device 200c may exchange signals with the storage device 300c via the first pin 202 and the third pin 204.

The second pin 302 may be electrically connected to the first storage controller 310a, and the fourth pin 304 may be electrically connected to the second storage controller 310b. The storage device 300c may exchange signals with the host device 200c via the second pin 302 and the fourth pin 304.

The storage system 100c may further include the second interface disposed between the third pin 204 of the host device 200c and the fourth pin 304 of the storage device 300c. In FIG. 5, a bi-directional arrow illustrated between the third pin 204 and the fourth pin 304 may represent the second interface. The host device 200c and the storage device 300c may communicate via the first pin 202, the second pin 302, the third pin 204, the fourth pin 304, the first interface and the second interface.

Figure 6:
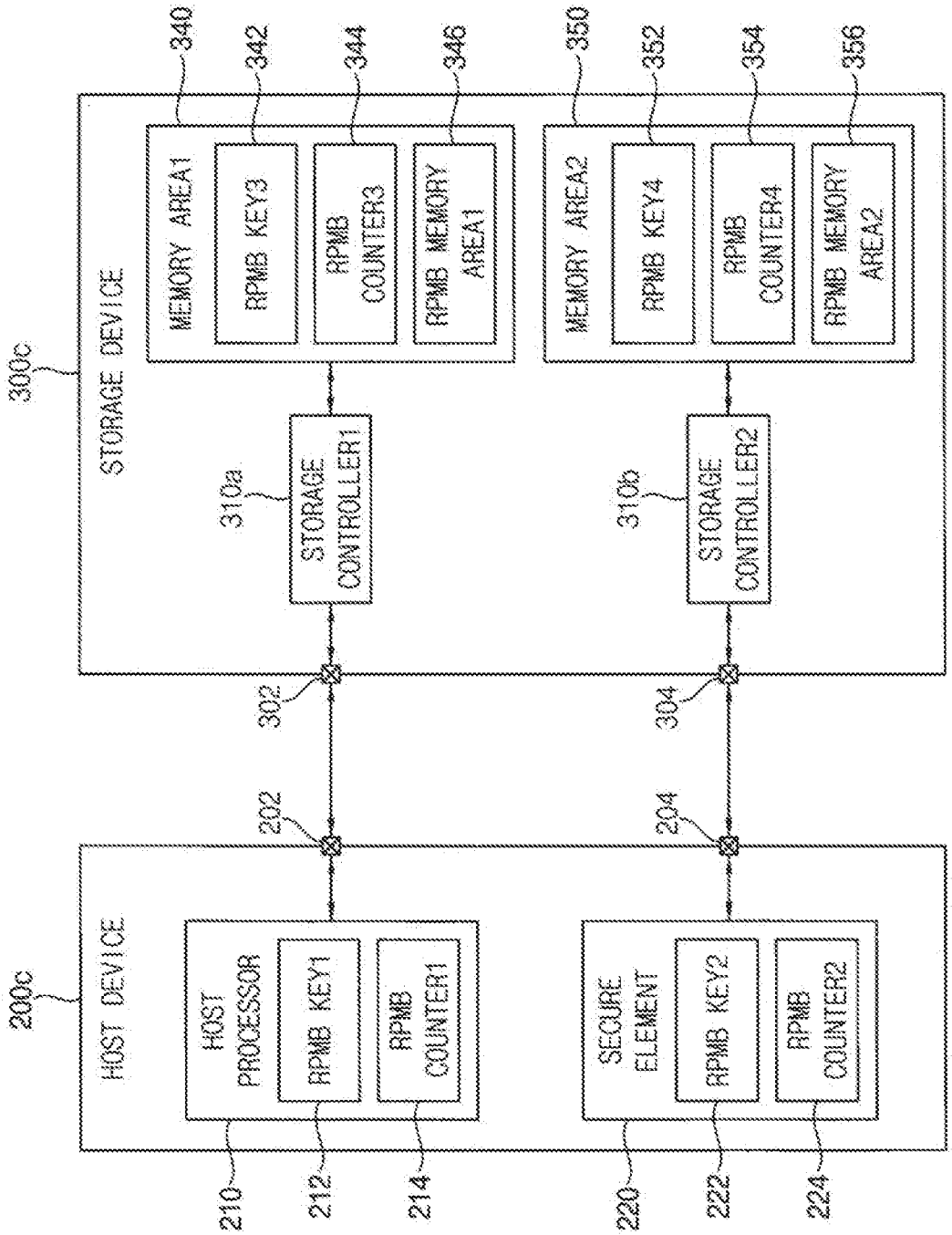
FIG. 6 is a block diagram illustrating an example where a RPMB sub-system for a host processor and a RPMB sub-system for a secure element are separate from each other in the storage system of FIG. 5, according to example embodiments.

FIG. 6 is a block diagram illustrating an example where a RPMB sub-system for a host processor and a RPMB sub-system for a secure element are separate from each other in the storage system of FIG. 5, according to example embodiments. The descriptions repeated with FIGS. 2 and 4 will be omitted.

Referring to FIG. 6, configurations of the host processor 210 and the secure element 220 included in the host device 200c and configurations of the first and second storage controllers 310a and 310b and the first and second memory areas 340 and 350 included in the storage device 300c may be substantially the same as those described with reference to FIG. 4.

The first pin 202 may be connected to the host processor 210, the second pin 302 may be connected to the first storage controller 310a, and the first interface may be disposed or formed between the first pin 202 and the second pin 302. The third pin 204 may be connected to the secure element 220, the fourth pin 304 may be connected to the second storage controller 310b, and the second interface may be disposed or formed between the third pin 204 and the fourth pin 304.

In some example embodiments, the first interface and the second interface may conform to different protocols and may exchange signals based on the different protocols. For example, as described with reference to FIG. 2, the first interface may include a normal or general eMMC or UFS interface. The second interface may be different from the first interface and may include a dedicated security interface (or a dedicated security protocol) for secure communication.

In an example of FIG. 6, the host processor 210, the first pin 202, the first interface, the second pin 302, the first storage controller 310a and the first memory area 340 may form the first RPMB sub-system for the host processor 210. In the example of FIG. 6, the secure element 220, the third pin 204, the second interface, the fourth pin 304, the second storage controller 310b and the second memory area 350 may form the second RPMB sub-system for the secure element 220. In other words, the first memory area 340 and the second memory area 350 are separate, distinguished and/or distinct from each other to functionally separate the first RPMB sub-system for the host processor 210 and the second RPMB sub-system for the secure element 220, and the first RPMB sub-system for the host processor 210 and the second RPMB sub-system for the secure element 220 may also be physically separated from each other such that the first RPMB sub-system for the host processor 210 and the second RPMB sub-system for the secure element 220 do not share any elements. An example of FIG. 6 may have a higher security level by not sharing any elements as compared to examples of FIGS. 2 and 4.

The host processor 210 may access the first memory area 340 via the first pin 202, the first interface, the second pin 302 and the first storage controller 310a, and the secure element 220 may access the second memory area 350 via the third pin 204, the second interface, the fourth pin 304 and the second storage controller 310b. In other words, the first memory area 340 and the second memory area 350 may be accessed using different interfaces in an example of FIG. 6.

Figure 7:
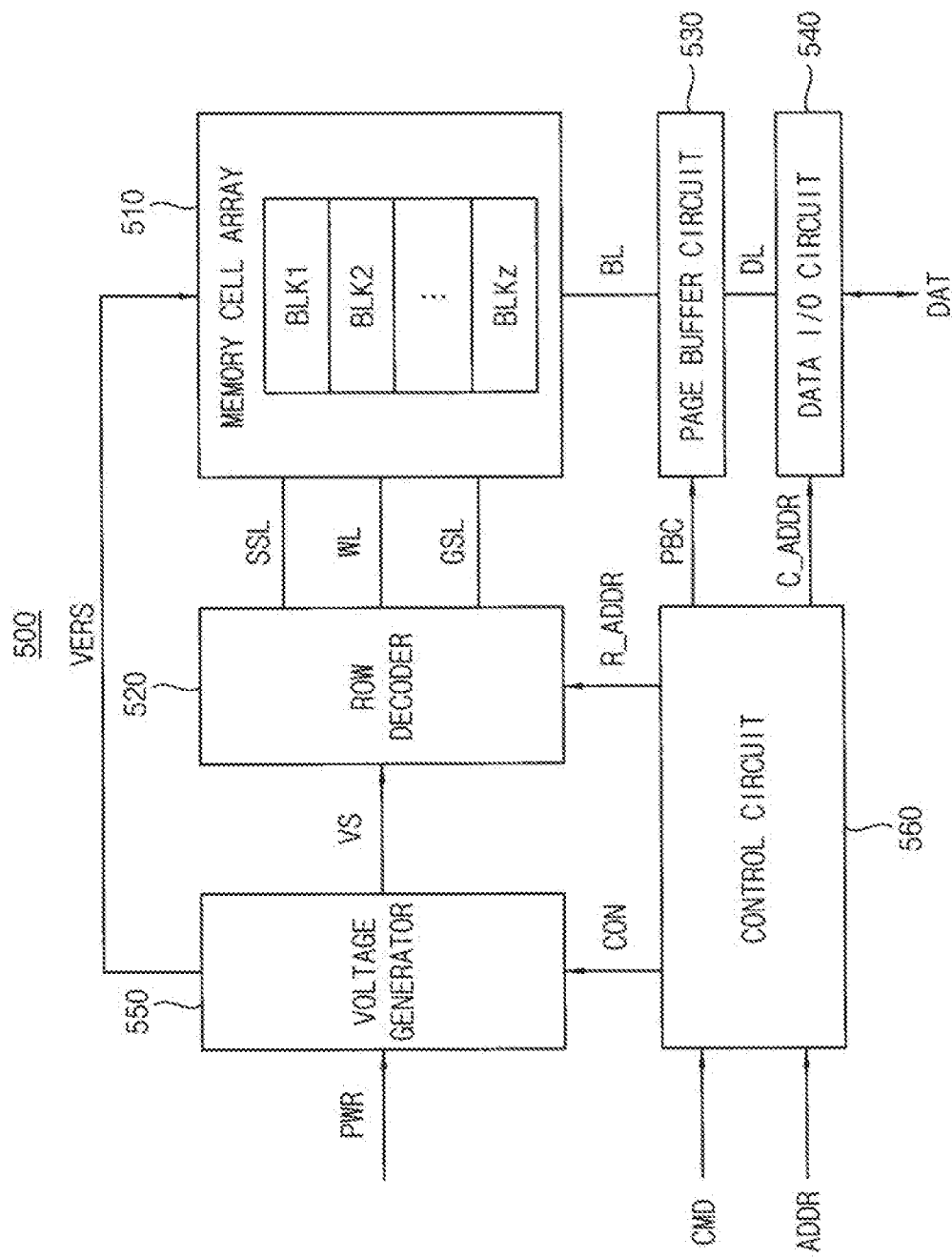
FIG. 7 is a block diagram illustrating an example of a nonvolatile memory included in a storage device in a storage system according to example embodiments.

FIG. 7 is a block diagram illustrating an example of a nonvolatile memory included in a storage device in a storage system according to example embodiments. The nonvolatile memory of FIG. 7 may be an example of the nonvolatile memories (NVMs) 320a, 320b, and 320c of FIGS. 1, 3, and 5.

Referring to FIG. 7, a nonvolatile memory 500 may include a memory cell array 510, a row decoder 520, a page buffer circuit 530, a data input/output (I/O) circuit 540, a voltage generator 550 and a control circuit 560.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In some example embodiments, the plurality of memory cells may be arranged in a two dimensional (2D) array structure or a three dimensional (3D) vertical array structure.

A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from an external device (e.g., the host device 200a and/or the storage controller 310 in FIG. 1), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL and the plurality of ground selection lines GSL.

For example, in the data erase/write/read operations, the row decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the row decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the row decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the row decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line contact and/or the bitline BL of a memory block (e.g., a selected memory block) and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recover read operation, the voltage generator 550 may apply the read voltage to a wordline adjacent to the selected wordline and may apply a recover read voltage to the selected wordline via the row decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 8:
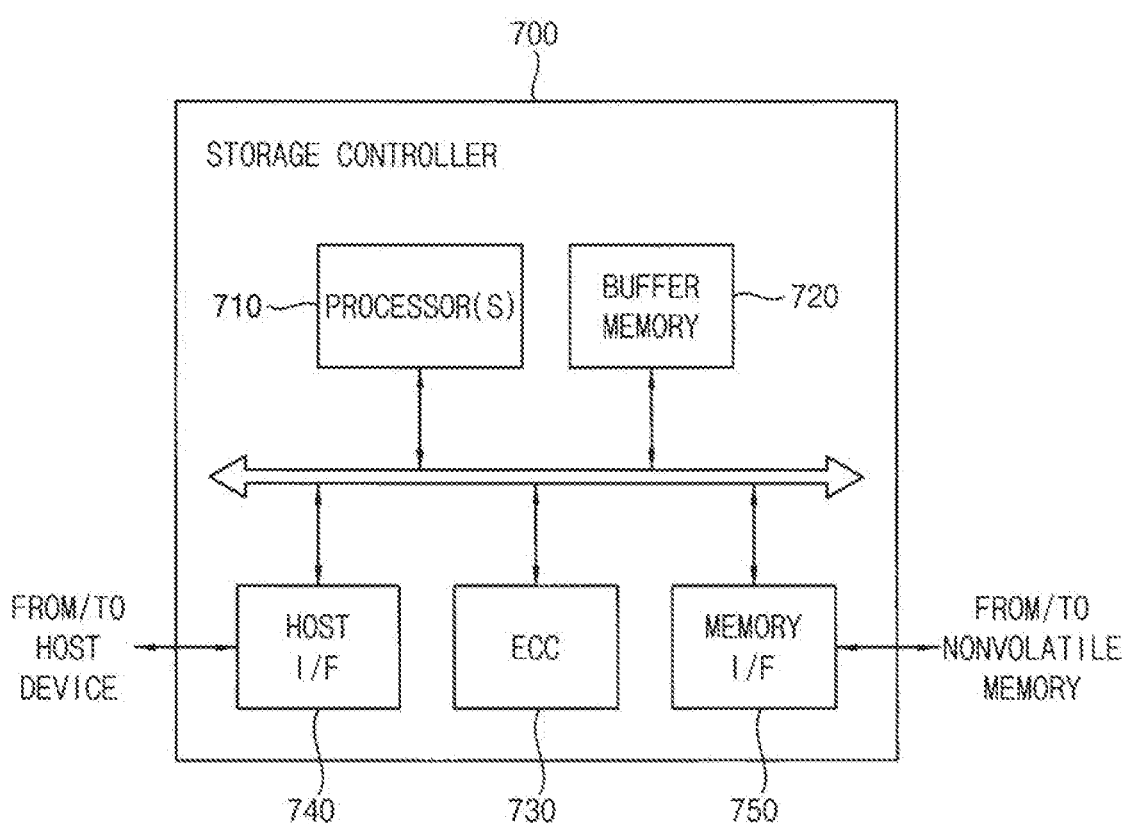
FIG. 8 is a block diagram illustrating an example of a storage controller included in a storage device in a storage system according to example embodiments.

FIG. 8 is a block diagram illustrating an example of a storage controller included in a storage device in a storage system according to example embodiments. The storage controller of FIG. 8 may be an example of the storage controller 310 of FIGS. 1-6.

Referring to FIG. 8, a storage controller 700 may include at least one processor 710, a buffer memory 720, an error correction code (ECC) block 730, a host interface 740 and a memory interface (I/F) 750.

The processor 710 may control an operation of the storage controller 700 in response to a command received via the host interface 740 from a host device (e.g., the host device 200a in FIG. 1). In some example embodiments, the processor 710 may control respective components by employing firmware for operating a storage device (e.g., the storage device 300a in FIG. 1).

The buffer memory 720 may store instructions and data executed and processed by the processor 710. For example, the buffer memory 720 may be implemented with a volatile memory, such as a static random access memory (SRAM), a dynamic random access memory (DRAM), or the like. In some example embodiments, the buffer memory 720 may be a cache memory for the processor 710.

The ECC block 730 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 740 may provide physical connections between the host device (e.g., the host device 200 described above with reference to FIGS. 1-6) and the storage device (e.g., the storage device 300 described above with reference to FIGS. 1-6). The host interface 740 may provide an interface corresponding to a bus format of the host for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 750 may exchange data with nonvolatile memories (e.g., the nonvolatile memories (NVMs) 320a, 320b and 320c in FIGS. 1, 3, and 5). The memory interface 750 may transfer data to the nonvolatile memories, or may receive data read from the nonvolatile memories. In some example embodiments, the memory interface 750 may be connected to the nonvolatile memories via one channel. In other example embodiments, the memory interface 750 may be connected to the nonvolatile memories via two or more channels.

Figure 9:
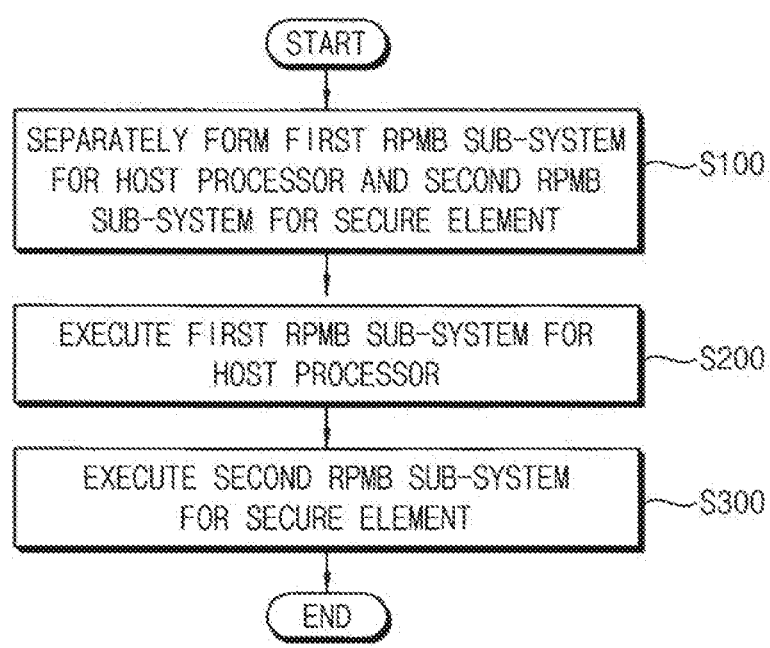
FIG. 9 is a flowchart illustrating a method of operating a storage system according to example embodiments.

FIG. 9 is a flowchart illustrating a method of operating a storage system according to example embodiments.

Referring to FIG. 9, a storage system according to example embodiments includes a host device and a storage device controlled by the host device. As described with reference to FIGS. 1 through 6, the host device includes a host processor and a secure element that are separate and/or distinguished from each other, and the storage device includes a first memory area and a second memory area that are separate and/or distinguished from each other.

In a method of operating the storage system according to example embodiments, a first RPMB sub-system for the host processor and a second RPMB sub-system for the secure element are separately formed (step S100). For example, the first RPMB sub-system for the host processor and the second RPMB sub-system for the secure element may be separately formed such that the host processor includes a first RPMB key and a first RPMB counter that are associated with the first RPMB sub-system for the host processor, the secure element includes a second RPMB key and a second RPMB counter that are associated with the second RPMB sub-system for the secure element, the first memory area accessed by the host processor includes a third RPMB key, a third RPMB counter and a first data space that are associated with the first RPMB sub-system for the host processor, and the second memory area accessed by the secure element includes a fourth RPMB key, a fourth RPMB counter and a second data space that are associated with the second RPMB sub-system for the secure element.

In some example embodiments, as described with reference to FIGS. 1 and 2, the first memory area and the second memory area may be controlled by the same storage controller and may be accessed using the same interface. In other example embodiments, as described with reference to FIGS. 3 and 4, the first memory area and the second memory area may be controlled by different storage controllers and may be accessed using the same interface. In still other example embodiments, as described with reference to FIGS. 5 and 6, the first memory area and the second memory area may be controlled by different storage controllers and may be accessed using different interfaces.

The first RPMB sub-system for the host processor is executed (step S200). For example, the first RPMB sub-system for the host processor may be executed based on the host processor, the first RPMB key, the first RPMB counter, the first memory area, the third RPMB key, the third RPMB counter and the first data space. The second RPMB sub-system for the secure element is executed (step S300). For example, the second RPMB sub-system for the secure element may be executed based on the secure element, the second RPMB key, the second RPMB counter, the second memory area, the fourth RPMB key, the fourth RPMB counter and the second data space. For example, as described with reference to FIG. 2, data write/read operations according to the RPMB sub-system may be performed.

Although FIG. 9 illustrates that steps S200 and S300 are sequentially performed, this is only an example. In some example embodiments, one of the first RPMB sub-system for the host processor and the second RPMB sub-system for the secure element may be selectively/independently executed.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 10:
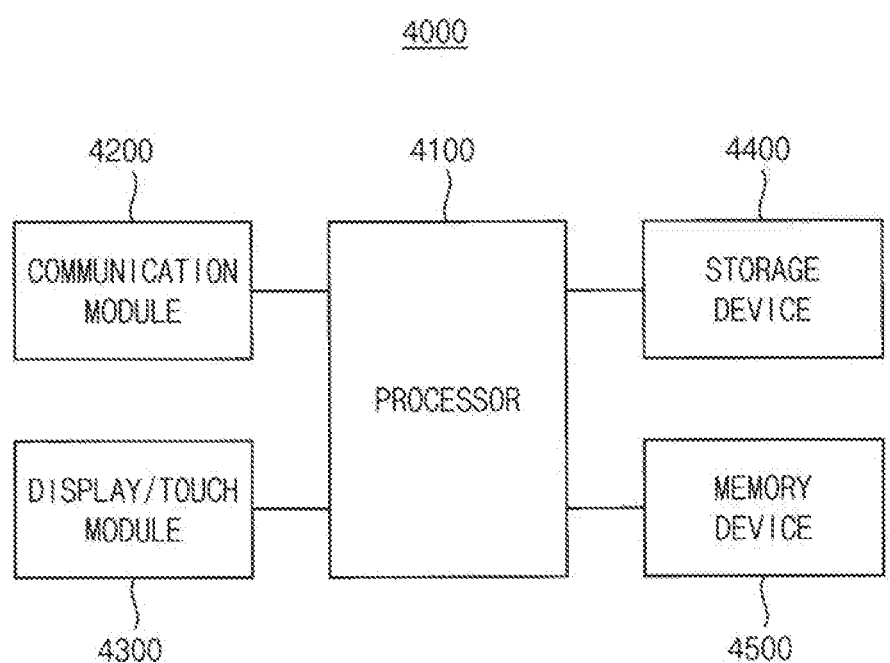
FIG. 10 is a block diagram illustrating an electronic system according to example embodiments.

FIG. 10 is a block diagram illustrating an electronic system according to example embodiments.

Referring to FIG. 10, an electronic system 4000 includes at least one processor 4100, a communication module 4200, a display/touch module 4300, a storage device 4400, and a memory device 4500. For example, the electronic system 4000 may be any mobile system or any computing system.

The processor 4100 controls operations of the electronic system 4000. The processor 4100 may execute an operating system and at least one application to provide an internet browser, games, videos, or the like. The communication module 4200 is implemented to perform wireless or wire communications with an external device. The display/touch module 4300 is implemented to display data processed by the processor 4100 and/or to receive data through a touch panel. The storage device 4400 is implemented to store user data, and is driven based on the method of operating the storage device according to example embodiments. The memory device 4500 temporarily stores data used for processing operations of the electronic system 4000.

The processor 4100 and the storage device 4400 in FIG. 10 may correspond to the host device 200 and the storage device 300 included in the storage system 100 according to example embodiments, respectively. The first RPMB sub-system for the host processor and the second RPMB sub-system for the secure element may be separately formed in the storage system according to example embodiments, thereby improving or enhancing security performance.

The inventive concept may be applied to various electronic devices and systems including the storage systems. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage system comprising:
a host device including a host processor and a secure element distinguished from the host processor; and
a storage device controlled by the host device, the storage device including a first memory area accessed by the host processor, and a second memory area distinguished from the first memory area and accessed by the secure element,
wherein the host processor includes a first replay protected memory block (RPMB) key and a first RPMB counter that are associated with a first RPMB sub-system for the host processor,
wherein the secure element includes a second RPMB key and a second RPMB counter that are associated with a second RPMB sub-system for the secure element,
wherein the first memory area includes a third RPMB key, a third RPMB counter and a first data space that are associated with the first RPMB sub-system for the host processor, and
wherein the second memory area includes a fourth RPMB key, a fourth RPMB counter and a second data space that are associated with the second RPMB sub-system for the secure element.

2. The storage system of claim 1, wherein the storage device further includes:
a storage controller configured to control access to the first memory area and the second memory area.

3. The storage system of claim 2, wherein:
the host device further includes a first pin connected in common to the host processor and the secure element,
the storage device further includes a second pin connected to the storage controller, and
the storage system further includes a first interface disposed between the first pin and the second pin.

4. The storage system of claim 1, wherein the storage device further includes:
a first storage controller configured to control access to the first memory area; and
a second storage controller distinguished from the first storage controller and configured to control access to the second memory area.

5. The storage system of claim 4, wherein:
the host device further includes a first pin connected in common to the host processor and the secure element,
the storage device further includes a second pin connected in common to the first storage controller and the second storage controller, and
the storage system further includes a first interface disposed between the first pin and the second pin.

6. The storage system of claim 4, wherein:
the host device further includes a first pin connected to the host processor, and the storage device further includes a second pin connected to the first storage controller,
the host device further includes a third pin connected to the secure element, and the storage device further includes a fourth pin connected to the second storage controller, and
the storage system further includes a first interface disposed between the first pin and the second pin, and a second interface disposed between the third pin and the fourth pin.

7. The storage system of claim 6, wherein the first interface and the second interface are based on different protocols.

8. The storage system of claim 1, wherein:
a value of the first RPMB key and a value of the third RPMB key are equal to each other, and
a first count value of the first RPMB counter and a third count value of the third RPMB counter are equal to each other.

9. The storage system of claim 1, wherein:
a value of the second RPMB key and a value of the fourth RPMB key are equal to each other, and a second count value of the second RPMB counter and a fourth count value of the fourth RPMB counter are equal to each other.

10. The storage system of claim 1, wherein:
a value of the first RPMB key and a value of the second RPMB key are different from each other, and
a first count value of the first RPMB counter and a second count value of the second RPMB counter are different from each other.

11. The storage system of claim 1, wherein:
a value of the third RPMB key and a value of the fourth RPMB key are different from each other, and
a third count value of the third RPMB counter and a fourth count value of the fourth RPMB counter are different from each other.

12. The storage system of claim 1, wherein the storage device includes a plurality of nonvolatile memories.

13. The storage system of claim 12, wherein the first memory area and the second memory area are included in a same nonvolatile memory of the plurality of nonvolatile memories.

14. The storage system of claim 12, wherein the first memory area and the second memory area are included in different nonvolatile memories of the plurality of nonvolatile memories.

15. The storage system of claim 1, wherein the storage device is an embedded multi-media card (eMMC) or a universal flash storage (UFS).

16. A method of operating a storage system including a host device and a storage device, the host device including a host processor and a secure element distinguished from each other, the storage device being controlled by the host device and including a first memory area and a second memory area distinguished from each other, the method comprising:
separately forming a first replay protected memory block (RPMB) sub-system for the host processor and a second RPMB sub-system for the secure element such that the host processor includes a first RPMB key and a first RPMB counter that are associated with the first RPMB sub-system for the host processor, the secure element includes a second RPMB key and a second RPMB counter that are associated with the second RPMB sub-system for the secure element, the first memory area accessed by the host processor includes a third RPMB key, a third RPMB counter and a first data space that are associated with the first RPMB sub-system for the host processor, and the second memory area accessed by the secure element includes a fourth RPMB key, a fourth RPMB counter and a second data space that are associated with the second RPMB sub-system for the secure element;
executing the first RPMB sub-system for the host processor based on the host processor, the first RPMB key, the first RPMB counter, the first memory area, the third RPMB key, the third RPMB counter and the first data space; and
executing the second RPMB sub-system for the secure element based on the secure element, the second RPMB key, the second RPMB counter, the second memory area, the fourth RPMB key, the fourth RPMB counter and the second data space.

17. The method of claim 16, wherein the first memory area and the second memory area are controlled by a same storage controller.

18. The method of claim 16, wherein the first memory area and the second memory area are controlled by different storage controllers.

19. The method of claim 16, wherein the first memory area and the second memory area are accessed using a same interface.

20. The method of claim 16, wherein the first memory area and the second memory area are accessed using different interfaces.

* * * * *